US010685151B2

(12) United States Patent
Liu et al.

(10) Patent No.: US 10,685,151 B2
(45) Date of Patent: Jun. 16, 2020

(54) METHOD AND APPARATUS FOR SIMULATING POSTURE OF FLEXIBLE CABLE BASED ON SPRING-MASS MODEL COMBINING BENDING AND TORSION

(71) Applicant: Beijing Institute of Technology, Beijing (CN)

(72) Inventors: Jianhua Liu, Beijing (CN); Naijing Lv, Beijing (CN); Xiaoyu Ding, Beijing (CN); Shaoli Liu, Beijing (CN); Jiashun Liu, Beijing (CN); Haili Lin, Beijing (CN); Jiangtao Ma, Beijing (CN)

(73) Assignee: BEIJING INSTITUTE OF TECHNOLOGY, Beijing (CN)

( * ) Notice: Subject to any disclaimer, the term of this patent is extended or adjusted under 35 U.S.C. 154(b) by 570 days.

(21) Appl. No.: 15/377,941

(22) Filed: Dec. 13, 2016

(65) Prior Publication Data
US 2017/0124230 A1   May 4, 2017

(30) Foreign Application Priority Data

Nov. 2, 2015 (CN) .......................... 2015 1 0732135

(51) Int. Cl.
*G06F 30/20* (2020.01)
*G06F 17/11* (2006.01)
(Continued)

(52) U.S. Cl.
CPC .............. *G06F 30/20* (2020.01); *G06F 17/11* (2013.01); *G06F 17/16* (2013.01); *G06F 2111/10* (2020.01); *G06F 2113/16* (2020.01)

(58) Field of Classification Search
CPC ...... G06F 17/5009; G06F 17/11; G06F 17/16; G06F 2217/36; G06F 2217/16
(Continued)

(56) References Cited

FOREIGN PATENT DOCUMENTS

CN        101727523 A  *  6/2010  ............. G06F 17/50

OTHER PUBLICATIONS

Hongxiang Ren, Kelun Wang, Cable Simulation in Scene of Tug Handling Simulator, 2013, International Conference on Mechtronic Sciences, Electrical Engineering and Computer (MEC) Dec. 20-22, 2013, Shenyang China, pp. 2472-2476.*

(Continued)

*Primary Examiner* — Rehana Perveen
*Assistant Examiner* — Chuen-Meei Gan
(74) *Attorney, Agent, or Firm* — Patterson + Sheridan LLP

(57) ABSTRACT

A method for simulating a posture of a flexible cable based on a spring-mass model combining bending and torsion includes: establishing a physical property model of the cable, wherein a torsion property is represented by a torsion spring attached at each 55 cable segment; obtaining an initial position of each discrete mass point based on a total length of the cable and the number of the cable segments; identifying discrete mass points at both ends as fixed points, and obtaining their position information; calculating stress information of other discrete mass points whose position information is not determined based on the physical property model; sequentially calculating 10 10 equilibrium positions of the other discrete mass points by using the stress information and the initial positions to obtain their the position information; and simulating a stable posture of the cable based on the position information of the fixed points and the other discrete mass points.

12 Claims, 11 Drawing Sheets

(51) Int. Cl.
*G06F 17/16* (2006.01)
*G06F 111/10* (2020.01)
*G06F 113/16* (2020.01)

(58) Field of Classification Search
USPC .......................................................... 703/2
See application file for complete search history.

(56) References Cited

OTHER PUBLICATIONS

Translation of CN 101727523A from Ip.com 2010, 20 pages.*
Brown, Joel, et al.—"Real-time knot-tying simulation," The Visual Computer, 2004, 20(2-3), pp. 165-179.
Grégoire, Mireille, et al.—"Interactive simulation of one-dimensional flexible parts," Computer-Aided Design, 2007, 39(8), pp. 694-707.
Haumann, D. R., et al.—"The behavioral test-bed: Obtaining complex behavior from simple rules," The Visual Computer, 1988, 4(b), pp. 332-347.
Hergenröther, Elke, et al.—"Real-time virtual cables based on kinematic simulation," Proceedings of WSCG, Univ. of West Bohemia, Plzen, Czech Republic, 2000, pp. 402-409.
Liu, J. H., et al.—"Motional cable harness physical characteristic oriented modeling and kinetic simulation technology in virtual environment," Journal of Mechanical Engineering, 2011, 47(9), pp. 117-124 (in Chinese with English abstract).
Loock, Achim, et al.—"A virtual environment for interactive assembly simulation: from rigid bodies to deformable cables," 5th World Multiconference on Systemics, Cybernetics and Informatics (SCI), Citeseer, 2001, pp. 325-332.
Moll, M., et al.—"Path planning for deformable linear objects," IEEE Transactions on Robotics, 2006, 22(4), pp. 525-636.
Provot, Xavier—"Deformation constraints in a mass-spring model to describe rigid cloth behavior," Proceedings of the 1995 Graphics Interface Conference, Canadian Information Processing Soc., Quebec, Quebec, Canada, 1995, pp. 147-154.
Wang, F., et al.—"Knot-tying with visual and force feedback for VR laparoscopic training," Proceedings of the 27th Annual International Conference of the IEEE Engineering in Medicine and Biology Society (IEEE-EMBS), Sep. 1-4, 2005, pp. 5778-5781.
Wang, Zhibin, et al.—"A multi-branch mass-spring model for virtual assembly of cable harness," Journal of Mechanical Engineering, 2014, vol. 50, No. 3, pp. 174-183 (in Chinese with English abstract).

* cited by examiner

METHOD AND APPARATUS FOR SIMULATING POSTURE OF FLEXIBLE CABLE BASED ON SPRING-MASS MODEL COMBINING BENDING AND TORSION

CROSS-REFERENCE TO RELATED APPLICATION

The present application claims priority to Chinese patent application No. 201510732135.1 filed on Nov. 2, 2015, which is incorporated herein by reference in its entirety.

TECHNICAL FIELD

The present disclosure relates to the field of mechanical engineering, and in particular to a method and apparatus for simulating a posture of a flexible cable based on a spring-mass model combining bending and torsion.

BACKGROUND

Cable is a general term for wires and electric lines that connecting electrical components, electrical equipments or control devices in electromechanical system of complex product, and plays important role as a medium for transferring power and signal. The rationality of layout design and the assembly reliability of cable will directly affect the performance of the final product. In recent years, with the development of CAD technology and virtual reality technology, assembly simulation of a flexible cable under virtual environment has gradually attracted attention. Through the assembly simulation of the cable, the assemblability and rationality of cable design can be verified, and can thus forecast the problems that may occurred in the practical assembling of the cable, so as to solve the problems in advance.

Model representation of the cable is the basis for the assembly simulation of the cable under virtual environment. The model representation of the cable under virtual environment needs, in one hand, to truly represent a spatial shape and a physical property of the cable, and in the other hand, also to meet the real-time requirement of a virtual reality system, that is, the solving rate shall meet the operational requirement of the virtual assembly simulation.

The geometry model of the cable may lacks of reality if the physical property of the cable is not taken into account. A physical model of the cable becomes the major research project of domestic and overseas scholars in recent years, because the physical model can more truly reflect the shape of the cable. A spring-mass model is used as a simple, good real-time physical model in simulating a flexible body such as fabric, skin, cable etc. The spring-mass model is initially proposed by Haumann and Parent (*The behavioral test-bed: Obtaining complex behavior from simple rules*, The Visual Computer, 1988, 4(6): 332-347); they assemble an experimental apparatus by connecting mass points with springs. According to the theory of Newton's laws of motion, the mass points will be moved under external force.

Provot et al. (*Deformation constraints in a mass-spring model to describe rigid cloth behavior*, Proceedings of the 1995 Graphics Interface Conference, Canadian Information Processing Soc., Quebec, Que, Can, 1995, pp. 147-154) improve the spring-mass model by adding a linear spring, which is also referred to as bending spring, in between two spaced mass points, which resulting in good effect in terms of simulating the bending behavior of fabric. Loock et al. (*A virtual environment for interactive assembly simulation: from rigid bodies to deformable cables*, 5th World Multi-conference on Systemics, Cybernetics and Informatics (SCI), Citeseer, 2001, pp. 325-332) use the spring-mass model in modeling of the flexible cable, and improve the spring-mass model once again. They abstract the cable into being consisted of mass points and springs, wherein two adjacent mass points are still connected by a linear spring, but a coil spring, instead of the linear spring between two spaced mass points, is added at each of the mass points, thereby improving bending effect of the cable. The improved model is used to stimulate spatial shapes of cables of different rigidities under gravity.

On the basis of the above mentioned model, Wang Zhibin et al. (*A multi-branch mass-spring model for virtual assembly of cable harness*, Journal of Mechanical Engineering, 2014, Vol 50, No. 3, pp. 174-183) propose a multi-branch spring-mass model for modeling of a multi-branch cable by adding branch points, which realize the simulation of the multi-branch cable. Although their model is capable of modeling tension, bending, gravity and other factors of the cable, the torsion of cable is not taken into account, so that their model cannot truly represent the spatial shape of the cable. Moll et al. (*Path planning for deformable linear objects*, IEEE Transactions on Robotics, 2006, 22(4): 625-636) describe equilibrium postures of a one-dimensional deformable body such as a cable etc. under a variety of operational constraints using an energy curve model. They associate energy of a curve with its curvature and torsion, and consider the curve to be in an equilibrium state when having minimum energy under a variety of constraints. But they assume that the curve has no mass and tension, so consider straight segment without distortion as having minimum energy in the absence of external force.

Hergenröther et al. (*Real-time virtual cables based on kinematic simulation*, Proceedings of WSCG, Univ. of West Bohemia, Plzen, Czech Republic, 2000, pp. 402-409) regard the cable as a series of cylindrical segments of equal length connected by spherical nodes for a fixed-length cable, arrange a coil spring at each of the nodes to represent bending of the cable, and solve the model using a method of energy (which is the sum of potential energy of the cylindrical segments and elastic potential energy of the coil springs) minimization and step-by-step subdivision, but torsion of the cable is still not represented. Wei Fayuan et al. model the cable with an inverse kinematics model by regarding the cable as a snake-like robot having multiple joints, and simulate the installation of the cable using an inverse kinematics method in robot theory. However, they assume that turning angles are the same at each joint in solving the model, which cannot accurately simulate the actual shape of the cable.

Liu Jianhua et al. (*Motional cable harness physical characteristic oriented modeling and kinetic simulation technology in virtual environment*, Journal of Mechanical Engineering, 2011, 47(9): 117-124) propose a method of physical property modeling and motion simulation for a movable cable based on a Kirchhoff thin elastic rod mechanical model. Grégoire et al. (*Interactive simulation of one-dimensional flexible parts*, Computer-Aided Design, 2007, 39(8): 694-707) represent the shape of cable with a general spring-mass model, and represent bending and torsion of the cable with a Cosserat model, and solve the equilibrium state of the cable by energy minimization process. These two methods can more truly represent the shape of the cable with higher accuracy, however, the solution process is complicated, and it is difficult to meet real-time requirement in interactive assembly.

In addition, the modeling of a one-dimension flexible body such as surgical suture and rope in other fields can be a reference for cable modeling. Since the suture, rope and the like often needed to be knotted in practical application, a knotting model of which puts forward higher requirement for real-time performance, collision detection and response and other aspects, which requirement is similar to that in the interactive assembly simulation for the modeling of the cable.

When modeling a rope, Brown et al. (*Real-time knot-tying simulation*, Visual Computer, 2004, 20(2-3): 165-179) regard the rope as a series of rigid straight segments of equal length connected by spherical nodes, and each of the nodes has two rotational degrees of freedom. Further, in order to meet real-time requirement in knotting the rope, they focus on treating the contact of the rope with surrounding objects and with itself, and solve the model using a simple "Follow the Leader" method, so that the nodes are moved along with the dragged points without changing the length of each of the rigid segments, which resulting in better knotting effect.

With respect to the problem in training laparoscopic operation, Wang et al. (*Knot-tying with visual and force feedback for VR laparoscopic training*, Proceedings of the 27th Annual International Conference of the IEEE Engineering in Medicine and Biology Society (IEEE-EMBS), 2005) perform a study on surgical suture simulation, and they synthetically take a variety of physical factors into account in developing a knotting model based on springs and mass points, thereby achieving the simulation of a knotted suture with force feedback. The knotting model differs from the cable model in that, the former places more focus on processing collision of a one-dimensional flexible body and has lower requirement in reality of its shape, but the cable model has higher requirement in reality.

From the foregoing, only the gravity, tensile and bending properties of the cable are taken into account in the conventional spring-mass model of the cable, but the torsion property of the cable is not taken into account, and the torsion effect of the cable cannot be modeled. Therefore, the simulation effect is not realistic enough, the rate of model solution is slow and the real-time requirement in the interactive assembly simulation cannot be met, so that the reliability in the process of assembling the flexible cable in the prior art cannot be ensured.

SUMMARY

An object of the present disclosure is to provide a method and an apparatus for simulating a posture of a flexible cable based on a spring-mass model combining bending and torsion, so as to solve the issue in the prior art that the simulation effect of the flexible cable model is unreal and the reliability in the process of assembling the flexible cable in the prior art thereby cannot be ensured.

In order to solve the above-mentioned technical issue, a method for simulating a posture of a flexible cable based on a spring-mass model combining bending and torsion is provided according to an embodiment of the present disclosure, which includes:
representing the flexible cable by combining and arranging multiple discrete mass points, so as to establish a physical property model of the flexible cable, wherein a tensile property of the flexible cable is represented by a linear spring between two adjacent discrete mass points on the flexible cable, a bending property of the flexible cable is represented by a bending spring attached at each of the discrete mass points, and a torsion property of the flexible cable is represented by a torsion spring attached at each cable segment of the flexible cable;
obtaining an initial position of each of the discrete mass points based on a total length of the flexible cable and the number of the cable segments;
identifying the discrete mass points at both ends of the flexible cable as fixed points, and obtaining position information of the fixed points;
calculating stress information at the other discrete mass points whose position information is not determined on the flexible cable based on the physical property model;
sequentially calculating equilibrium positions of the other discrete mass points whose position information is not determined by using the obtained stress information and the initial positions, so as to obtain the position information of the other discrete mass points; and
simulating a stable posture of the flexible cable based on the position information of the fixed points and the position information of the other discrete mass points on the flexible cable.

Optionally, before the step of identifying the discrete mass points at both ends of the flexible cable as fixed points, the method further includes determining whether the both ends of the flexible cable are connected to electrical connectors.

If so, obtaining the position information of the fixed points, and calculating position information of two discrete mass points adjacent to the fixed points on the flexible cable. Correspondingly, the step of calculating stress information of the other discrete mass points whose position information is not determined on the flexible cable based on the physical property model includes calculating the stress information of the other discrete mass points, in addition to the fixed points and the two discrete mass points adjacent to the fixed points, based on the physical property model.

If not, only identifying the discrete mass points at both ends of the flexible cable as fixed points, and obtaining position information of the fixed points. Correspondingly, the step of calculating stress information of the other discrete mass points whose position information is not determined on the flexible cable based on the physical property model includes calculating the stress information of the other discrete mass points, in addition to the fixed points, based on the physical property model.

Optionally, the step of calculating position information of the two discrete mass points adjacent to the fixed points on the flexible cable includes:
setting the two discrete mass points adjacent to the fixed points to be respectively located in tangential directions of each of the fixed points, and obtaining the position information of the two discrete mass points adjacent to the fixed points on the flexible cable through calculation.

Optionally, before the step of calculating stress information of the other discrete mass points whose position information is not determined on the flexible cable based on the physical property model, the method further includes determining whether there are any operated points among the other discrete mass points in addition to the fixed points.

If so, obtaining position information of the operated points based on position information of corresponding operating tools, and then performing the step of calculating the stress information of the other discrete mass points whose position information is not determined on the flexible cable based on the physical property model.

If not, directly performing the step of calculating the stress information of the other discrete mass points whose position information is not determined on the flexible cable based on the physical property model.

Optionally, the step of calculating stress information of the other discrete mass points whose position information is not determined on the flexible cable based on the physical property model includes calculating a gravity force, a tensile force, a bending force and a torsion force applied to the other discrete mass points.

Wherein the step of calculating the torsion force applied to the other discrete mass point includes:

obtaining, through analysis, torsion forces $F_{qi1}$ and $F_{qi2}$ applied by two torsion springs attached on cable segments i−1 and i+2 to a mass point i among the other discrete mass points;

obtaining torsion force components $F_{qi1}$ and $F_{qi2}$ applied by the cable segments i−1 and i+2 to the mass point i respectively; and obtaining a torsion force $F_i^t$ applied to the mass point i by summing the obtained torsion force components $F_{qi1}$ and $F_{qi2}$.

Optionally, the step of obtaining torsion force components $F_{qi1}$ and $F_{qi2}$ applied by the cable segments i−1 and i+2 to the mass point i respectively is performed using the following calculation formulae:

$F_{qi1} = k^r \times (q_{i-2} - q_{i-1}) \times \sin(\pi - \beta_{i-1}) \times [u_i \times u_{i-1} / \sin(\pi - \beta_{i-1})]$; and $F_{qi2} = k^r \times (q_{i+2} - q_{i+1}) \times \sin(\pi - \beta_{i+1}) \times [u_{i+2} \times u_{i+1} / \sin(\pi - \beta_{i+1})]$, wherein $F_{qi1}$ is a torsion force component applied by the cable segment i−1 to the mass point i;

$F_{qi2}$ is a torsion force component applied by the cable segment i+2 to the mass point i;

$k^r$ is an elastic coefficient of the torsion spring;

$q_{i-2}$, $q_{i-1}$, $q_{i+1}$ and $q_{i+2}$ are torsion angles at mass points i−2, i−1, i+1 and i+2, respectively;

$\beta_{i-1}$ is an angle between the $(i-1)^{th}$ cable segment and the $i^{th}$ cable segment;

$\beta_{i+1}$ is an angle between the $(i+1)^{th}$ cable segment and the $(i+2)^{th}$ cable segment;

$u_i \times u_{i-1} / \sin(\pi - \beta_{i-1})$ and $u_{i+2} \times u_{i+1} / \sin(\pi - \beta_{i+1})$ are unit vectors in the directions of the torsion force components $F_{qi1}$ and $F_{qi2}$, respectively; and $u_{i-1}$, $u_i$, $u_{i+1}$ and $u_{i+2}$ are a unit vector from the mass point i−2 to the mass point i−1, a unit vector from the mass point i−1 to the mass point i, a unit vector from the mass point i to the mass point i+1, and a unit vector from the mass point i+1 to the mass point i+2, respectively.

Optionally, before the step of sequentially calculating equilibrium positions of the other discrete mass points whose position information is not determined by using the obtained force information and the initial positions, so as to obtain the position information of the other discrete mass points, the method further includes:

performing collision detection and collision response for the flexible cable; and modifying the stress information based on the collision detection and collision response.

Optionally, the step of modifying the stress information based on the collision detection and collision response includes adding a supporting force $F_i^c$ along a normal direction of collision into the stress information, and $$F_i^c = \begin{cases} [-(G_i + F_i^s + F_i^b + F_i^t) \times n]n & , (G_i + F_i^s + F_i^b + F_i^t) \times n < 0 \\ 0 & , (G_i + F_i^s + F_i^b + F_i^t) \times n \geq 0 \end{cases},$$

$G_i$ represents a gravity force applied to the discrete mass point i;

$F_i^s$ represents a tensile force applied to the discrete mass point i;

$F_i^b$ represents a bending force applied to the discrete mass point i;

$F_i^t$ represents a torsion force applied to the discrete mass point i; and n represents a normal direction of collision of the discrete mass point i.

Optionally, the step of sequentially calculating equilibrium positions of the other discrete mass points whose position information is not determined by using the obtained stress information and the initial positions, so as to obtain the position information of the other discrete mass points includes:

calculating accelerations of the other discrete mass points based on the stress information;

calculating speeds of the other discrete mass points at a predetermined time based on initial speeds and the accelerations;

calculating positions of the other discrete mass points at the predetermined time based on the speeds and the initial positions; and performing stress analysis on the other discrete mass points at the positions at the predetermined time, and determining whether each of the other discrete mass points reaches an equilibrium state;

if so, identifying the positions at the predetermined time as the position information of the other discrete mass points; and if not, returning to the step of calculating the stress information of the other discrete mass points whose position information is not determined on the flexible cable based on the physical property model.

Optionally, the step of simulating a stable posture of the flexible cable based on the position information of the fixed points and the position information of the other discrete mass points on the flexible cable includes:

performing cubic-Bezier curve fitting based on the position information of the fixed points and the position information of the other discrete mass points, so as to obtain a posture curve of the flexible cable; and simulating a stable posture of the flexible cable based on the posture curve of the flexible cable and radius information.

An apparatus for simulating a posture of a flexible cable based on a spring-mass model combining bending and torsion is further provided according to an embodiment of the present disclosure, which includes:

an establishing module configured to represent the flexible cable by combining and arranging multiple discrete mass points and establish a physical property model of the flexible cable, wherein in the physical property model of the flexible cable, a tensile property of the flexible cable is represented by a linear spring between two adjacent discrete mass points on the flexible cable, a bending property of the flexible cable is represented by a bending spring attached at each of the discrete mass points, and a torsion property of the flexible cable is represented by a torsion spring attached at each cable segment of the flexible cable;

a first processing module configured to obtain an initial position of each of the discrete mass points based on a total length of the flexible cable and the number of the cable segments;

a second processing module configured to identify the discrete mass points at both ends of the flexible cable as fixed points, and obtain position information of the fixed points;

a third processing module configured to calculate stress information of the other discrete mass points whose position information is not determined on the flexible cable based on the physical property model;

a calculating module configured to sequentially calculate equilibrium positions of the other discrete mass points whose position information is not determined by using the obtained stress information and the initial positions, so as to obtain the position information of the other discrete mass points; and a fourth processing module configured to simulate a stable posture of the flexible cable based on the position information of the fixed points and the position information of the other discrete mass point on the flexible cable.

The above-described technical solutions of the present disclosure have beneficial effects as follows.

In the above-described technical solutions, with the method for simulating a posture of a flexible cable based on a spring-mass model combining bending and torsion, the representation of the torsion property of the cable is added in the physical property model of the flexible cable, and then the stable posture of the flexible cable is obtained through processing. Therefore, the simulation effect of the flexible cable is more real, and the reliability in the process of assembling the flexible cable is ensured to a certain degree.

DETAILED DESCRIPTION

In the following, the present disclosure is described in more details in conjunction with the drawings and specific embodiments, in order to make the technical issues to be solved, technical solutions and advantages of the present disclosure more clearly.

With respect to the issues present in the prior art that the simulation effect of the flexible cable model is not real enough and therefore the reliability in the process of assembling the flexible cable cannot be ensured, multiple solutions are provided according to the present disclosure, specifically as follows.

First Embodiment

Figure 1:
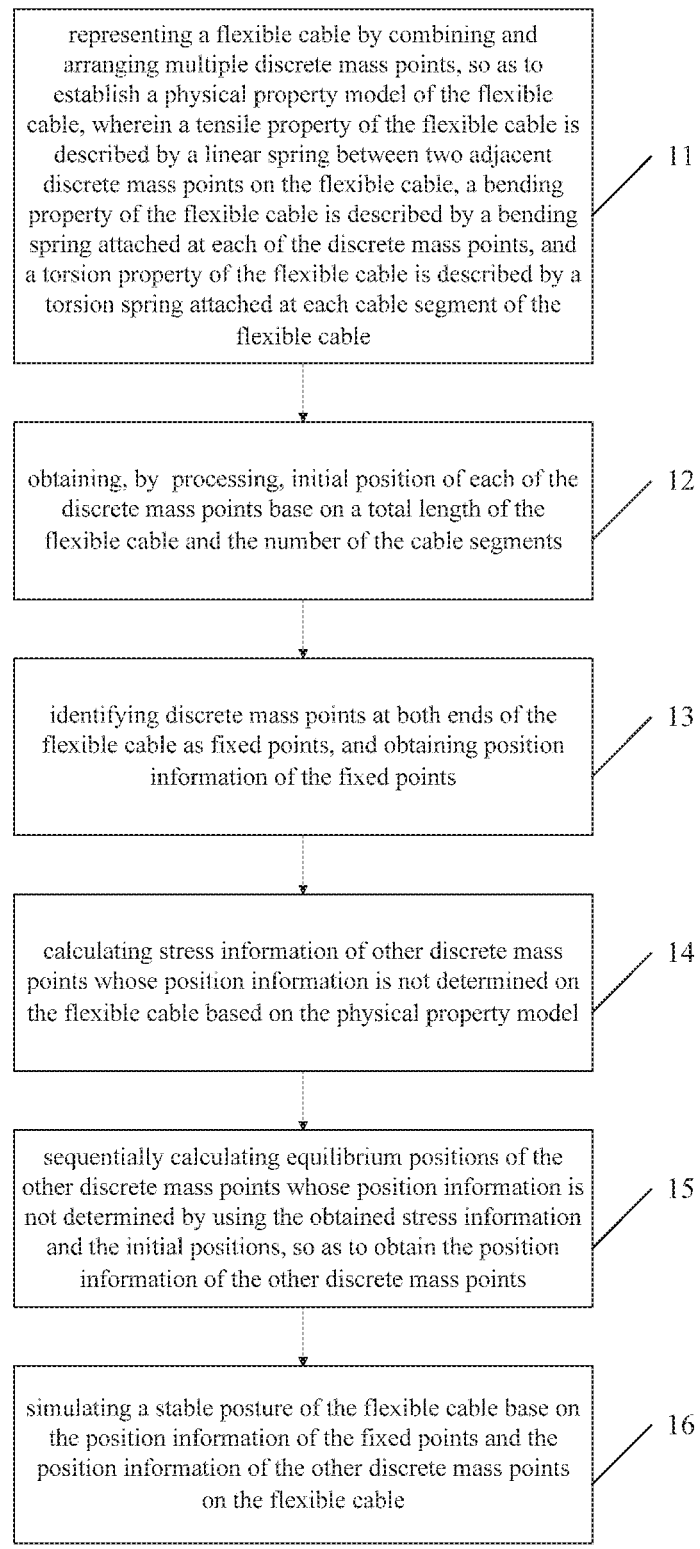
FIG. 1 is a schematic flowchart of a method for simulating a posture of a flexible cable according to a first embodiment of the present disclosure.

As shown in FIG. 1, a method for simulating a posture of a flexible cable based on a spring-mass model combining bending and torsion is provided according to a first embodiment of the present disclosure, which includes:

step 11: representing the flexible cable by combining and arranging multiple discrete mass points, so as to establish a physical property model of the flexible cable, wherein a tensile property of the flexible cable is described by a linear spring between two adjacent discrete mass points on the flexible cable, a bending property of the flexible cable is described by a bending springs attached at each of the discrete mass points, and a torsion property of the flexible cable is described by a torsion spring attached at each cable segment of the flexible cable;

step 12: obtaining an initial position of each of the discrete mass points based on processing on a total length of the flexible cable and the number of the cable segments;

step 13: identifying the discrete mass points at both ends of the flexible cable as fixed points, and obtaining position information of the fixed points;

step 14: calculating stress information at the other discrete mass points whose position information is not determined on the flexible cable based on the physical property model;

step 15: sequentially calculating equilibrium positions of the other discrete mass points whose position information is not determined by using the obtained stress information and the initial positions, so as to obtain the position information of the other discrete mass points; and step 16: simulating a stable posture of the flexible cable based on the position information of the fixed points and the position information of the other discrete mass points on the flexible cable.

By adding a representation of the torsion property of the cable into the physical property model of the flexible cable and then obtaining a stable posture of the flexible cable through processing, the method for simulating a posture of a flexible cable based on spring-mass model combining bending and torsion according to the first embodiment of the present disclosure makes the simulation effect of the flexible cable more real, and the reliability during the assembly of the flexible cable is ensured to a certain degree.

Further, before the step of identifying the discrete mass points at both ends of the flexible cable as fixed points, the method further includes determining whether the both ends of the flexible cable are connected to electrical connectors;
- if so, obtaining the position information of the fixed points, and calculating position information of two discrete mass points adjacent to the fixed points on the flexible cable;
- correspondingly, the step of calculating stress information of the other discrete mass points whose position information is not determined on the flexible cable based on the physical property model comprises calculating the stress information of the other discrete mass points, in addition to the fixed points and the two discrete mass points adjacent to the fixed points, based on the physical property model; and
- if not, only identifying the discrete mass points at both ends of the flexible cable as fixed points, and obtaining position information of the fixed points;
- correspondingly, the step of calculating stress information of the other discrete mass points whose position information is not determined on the flexible cable based on the physical property model comprises calculating the stress information of other discrete mass points, in addition to the fixed points, based on the physical property model.

Specifically, the step of calculating position information of the two discrete mass points adjacent to the fixed points on the flexible cable includes setting the two discrete mass points adjacent to the fixed points to be respectively located in tangential directions of the fixed points, and obtaining the position information of the two discrete mass points adjacent to the fixed points on the flexible cable through calculation.

Furthermore, before the step of calculating stress information of the other discrete mass points whose position information is not determined on the flexible cable based on the physical property model, the method further includes determining whether there are any operated points among the other discrete mass points in addition to the fixed points;
- if so, obtaining position information of the operated points based on position information of corresponding operating tools, and then performing the step of calculating the stress information of the other discrete mass points whose position information on the flexible cable is not determined based on the physical property model; and
- if not, directly performing the step of calculating stress information of the other discrete mass points whose position information on the flexible cable is not determined based on the physical property model.

As can be seen from the above, the step of calculating stress information of the other discrete mass points whose position information on the flexible cable is not determined based on the physical property model includes calculating a gravity force, a tensile force, a bending force and a torsion force applied to the other discrete mass points.

Specifically, the step of calculating the torsion force applied to the other discrete mass points includes: obtaining, through analysis, torsion forces $F_{qi1}$ and $F_{qi2}$ applied by two torsion springs attached on cable segments i−1 and i+2 to a mass point i among the other discrete mass points; obtaining torsion force components $F_{qi1}$ and $F_{qi2}$ applied by the cable segments i−1 and i+2 to the mass point i respectively; and obtaining a torsion force $F_i^t$ applied to the mass point i by summing the obtained torsion force components $F_{qi1}$ and $F_{qi2}$.

Preferably, the step of obtaining torsion force components $F_{qi1}$ and $F_{qi2}$ applied by the cable segments i−1 and i+2 to the mass point i respectively is performed using the following calculation formulae:

$$F_{qi1} = k^t \times (q_{i-2} - q_{i-1}) \times \sin(\pi - \beta_{i-1}) \times [u_i \times u_{i-1}/\sin(\pi - \beta_{i-1})]; \text{ and}$$

$$F_{qi2} = k^t \times (q_{i+2} - q_{i+1}) \times \sin(\pi - \beta_{i+1}) \times [u_{i+2} \times u_{i+1}/\sin(\pi - \beta_{i+1})].$$

Wherein $F_{qi1}$ is a torsion force component applied by the cable segment i−1 to the mass point i; $F_{qi2}$ is a torsion force component applied by the cable segment i+2 to the mass point i; $k^t$ is an elastic factor of the torsion spring; $q_{i-2}$, $q_{i-1}$, $q_{i+1}$ and $q_{i+2}$ are torsion angles at mass points i−2, i−1, i+1 and i+2, respectively; $\beta_{i-1}$ is an angle between the (i−1)$^{th}$ cable segment and the i$^{th}$ cable segment; $\beta_{+1}$ is an angle between the (i+1)$^{th}$ cable segment and the (i+2)$^{th}$ cable segment; $u_i \times u_{i-1}/\sin(\pi-\beta_{i-1})$ and $u_{i+2} \times u_{i+1}/\sin(\pi-\beta_{i+1})$ are unit vectors in the directions of the torsion force components $F_{qi1}$ and $F_{qi2}$, respectively; and $u_{i-1}$, $u_i$, $u_{i+1}$ and $u_{i+2}$ are a unit vector from the mass point i−2 to the mass point i−1, a unit vector from the mass point i−1 to the mass point i, a unit vector from the mass point i to the mass point i+1, and a unit vector from the mass point i+1 to the mass point i+2, respectively.

Considering a case in which the flexible cable suffers collision in actual applications, before the step of sequentially calculating equilibrium positions of the other discrete mass points whose position information is not determined using the obtained stress information and the initial positions, so as to obtaining the position information of the other discrete mass points, the method further includes:
- performing collision detection and collision response for the flexible cable; and
- modifying the stress information based on the collision detection and collision response.

Specifically, the step of modifying the stress information based on the collision detection and collision response includes adding a supporting force $F_i^c$ along a normal direction of collision into the stress information, and wherein $$F_i^c = \begin{cases} [-(G_i + F_i^s + F_i^b + F_i^t) \times n]n & ,(G_i + F_i^s + F_i^b + F_i^t) \times n < 0 \\ 0 & ,(G_i + F_i^s + F_i^b + F_i^t) \times n \geq 0 \end{cases}$$

Here $G_i$ represents a gravity force applied to the discrete mass point i; $F_i^s$ represents a tensile force applied to the discrete mass point i; $F_i^b$ represents a bending force applied to the discrete mass point i; $F_i^t$ represents a torsion force applied to the discrete mass point i; and n represents a normal direction of collision of the discrete mass point i.

In an embodiment of the present disclosure, optionally, the step of sequentially calculating equilibrium positions of the other discrete mass points whose position information is not determined using the obtained stress information and the initial positions, so as to obtain the position information of the other discrete mass points includes:
- calculating accelerations of the other discrete mass points based on the stress information;
- calculating speeds of the other discrete mass points at a predetermined time based on initial speeds and the accelerations;
- calculating positions of the other discrete mass points at the predetermined time based on the speeds and the initial positions; and performing stress analysis on the other discrete mass points at the positions at the predetermined time, and determining whether each of the other discrete mass points reaches an equilibrium state:
if so, identifying the positions at the predetermined time as the position information of the other discrete mass points; and
if not, returning to the step of calculating the stress information of the other discrete mass points whose position information is not determined on the flexible cable based on the physical property model.

Specifically, the step of simulating a stable posture of the flexible cable based on the position information of the fixed points and the position information of the other discrete mass points on the flexible cable includes:
performing cubic-Bezier curve fitting based on the position information of the fixed points and the position information of the other discrete mass points, so as to obtain a posture curve of the flexible cable; and
simulating a stable posture of the flexible cable based on the posture curve of the flexible cable and radius information.

Second Embodiment

A method for simulating a posture of a flexible cable based on a spring-mass model combining bending and torsion according to a second embodiment of the present disclosure is described specifically as follows.

Figure 2:
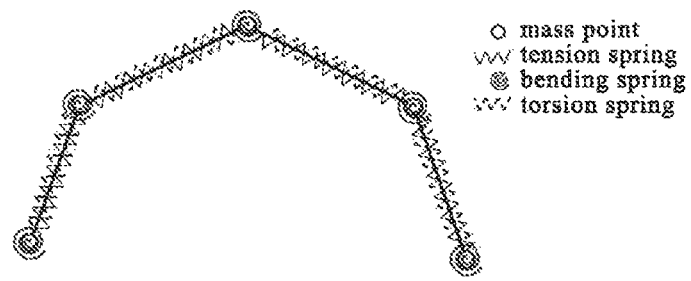
FIG. 2 is a schematic diagram of a spring-mass model combining bending and torsion for a flexible cable according to a second embodiment of the present disclosure.

Establishing a Physical Property Model, i.e., a Spring-Mass Model Combining Bending and Torsion The spring-mass model combining bending and torsion of the cable is shown in FIG. 2. In this model, the cable is regarded to be consisted of cable segments connected by a number of discrete mass points, and physical properties of the cable are represented by a variety of springs. In which each of the mass points has the same mass, and the sum of the masses of all mass points is equal to the total mass of the cable. A Linear spring connected between two adjacent discrete mass points represents a tensile property of the cable. A bending spring attached at each of the discrete mass points represents a bending property of the cable. Additionally, a torsion spring attached at each of the cable segments represents a torsion property of the cable, and a torsion force may be generated in a case that the torsion angles of the mass points at both ends of the cable segments are different from each other.

Physical Property Model Solution

Since the cable moves in a low speed in the processing of interactive assembly simulation, it is considered that the cable is in an equilibrium state in every moment, and the model solution is to obtain a stable posture of the cable at the present moment. Thus, the solution is performed from time to time, such that the postures of the cable throughout the assembly simulation process can be obtained.

The process of model solution is described as follows.

Assumed that a total length of the cable is $l^0$; the cable is consisted of n cable segments and (n+1) mass points, and the mass points are numbered by 0, 1, 2 . . . n; the mass of each of the mass points is represented by $m_i$ (i=0, 1, 2 . . . n), and each mass point has the same mass; a spatial position of each of the mass points is represented by a three-dimensional coordinate $x_i=(x_i^1, x_i^2, x_i^3)$; a torsion angle at each of the mass points is represented by $q_i$ (i=0, 1, 2 . . . n); a length of each of the cable segments is represented by $l_i$ (i=1, 2 . . . n); and a unit vector from the mass point i−1 to the mass point i is represented by $u_i$ (i=1, 2 . . . n).

[1]. In the first solution, the cable is firstly been equally divided base on the total length $l^0$ of the cable and the number in of the cable segments, so as to determine the initial position of each of the mass points.

[2]. Then, it is determined that whether the both ends of the flexible cable are connected to the electrical connectors; if not, two mass points 0 and n are regarded as fixed points; and if so, positions of four mass points 0, 1, n−1 and n are determined according to postures of the electrical connectors.

Figure 3:
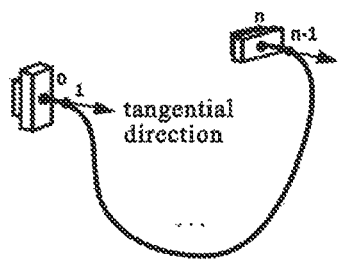
FIG. 3 is a schematic diagram of electrical connectors to be connected to the flexible cable according to the second embodiment of the present disclosure.

That is to say, since the solution with no constraint condition is useless, by default, both ends of the cable are always clamped during the solution process, that is, the both ends of the cable are identified as fixed points, so as to solve equilibrium positions of the remaining mass points. Whereas in actual applications, both ends of the cable are generally connected to electrical connectors (as shown in FIG. 3), so positions of the mass points 0 and n at both ends of the cable are positions of the two electrical connectors. Further, due to the existing of the electrical connectors, the cable is tangential constrained at both ends, and this effect has much greater affect on the cable segments near the ends of the cable than other effect such as gravity force etc. Therefore, it is considered that the positions of the mass points 1 and n−1 are positions of extended cable segments by a length $l_i^0$ from the ends in a tangential direction, respectively.

[3]. Then, it is determined that whether there are any operated points among the remaining mass points, that is, the points being clamped and operated by an operator using operating tools (which are selected by a mouse for operation in the virtual environment). If there are operated points, the positions of the operated points are the positions where the corresponding operating tools are located.

[4]. Then, stresses suffered by all remaining mass points are calculated sequentially with a calculation process as follows.

Stress analysis of mass points is performed by taking the mass point i as an example.

Gravity Force

Since the mass point has mass, the mass point suffers the effect of a gravity force, that is $$G_i = m_i g \qquad (1).$$

Tensile Force

Figure 4:
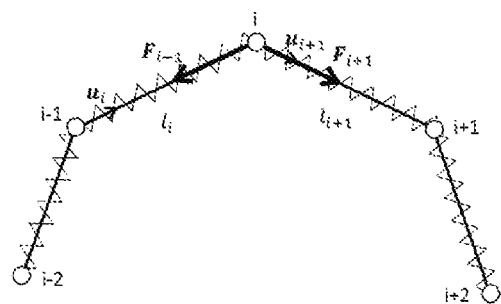
FIG. 4 is a schematic diagram of discrete mass points subjected to tensile forces according to the second embodiment of the present disclosure.

As shown in FIG. 4, due to the existing of tension springs, the mass point i is applied with tensile forces generated by two adjacent tension springs. A tensile force applied by a tension spring connecting the mass point i with the mass point i−1 to the mass point i is $$F_{i-1} = -k^s \times (l_i - l_i^0) \times u_i \qquad (2);$$

and a tensile force applied by a tension spring connecting the mass point i with the mass point i+1 to the mass point i is $$F_{i+1} k^s \times (l_{i+1} - l_{i+1}^0) \times u_{i+1} \qquad (3).$$

Wherein $k^s$ is an elastic coefficient of the tension spring, which is related to tensile strength of the cable; $l_i$ is a current length of the $i^{th}$ cable segment, that is, a distance between the mass point i−1 and the mass point i; $l_i^0$ is an initial length of the $i^{th}$ cable segment, and due to the cable segments are set to have identical length with each other, $l_i^0 = l^0/n$; $u_i$ and $u_{i+1}$ are unit vectors in the directions of pulling forces $F_{i-1}$ and $F_{i+1}$, respectively.

Then, the tensile force applied to the mass point i is $$F_i^s = F_{i-1} + F_{i+1} \qquad (4).$$

Bending Force

Figure 5:
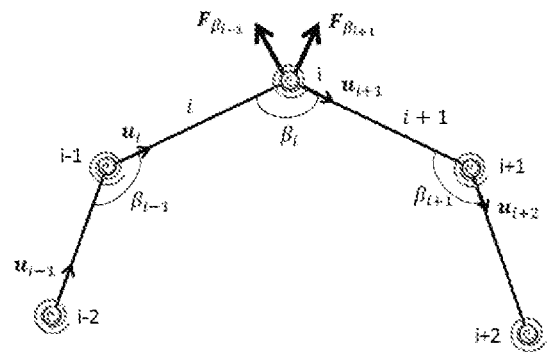
FIG. 5 is a schematic diagram of the discrete mass points subjected to bending forces according to the second embodiment of the present disclosure.

As shown in FIG. 5, due to the existing of bending springs, the mass point i is applied with bending forces generated by two bending springs adjacent to the mass point i. A force applied by a bending spring at the mass point i−1 to the mass point i is $$F_{\beta_{i-1}} = k^b \times (\pi - \beta_{i-1}) \times [u_i \times (u_{i-1} \times u_i) / \sin(\pi - \beta_{i-1})] \qquad (5);$$

and a force applied by a bending spring at the mass point i+1 to the mass point i is $$F_{\beta_{i+1}} = k^b \times (\pi - \beta_{i+1}) \times [u_i \times (u_i \times u_{i+1}) / \sin(\pi - \beta_i)] \qquad (6).$$

Wherein $k^b$ is an elastic coefficient of the bending spring, which is related to bending rigidity of the cable; $\beta_i$ is an angle between the $i^{th}$ cable segment and the $(i+1)^{th}$ cable segment, which can be obtained based on space coordinates of the mass points i−1, i and i+1; $u_i \times (u_{i-1} \times u_i) / \sin(\pi - \beta_{i-1})$ and $u_i \times (u_i \times u_{i+1}) / \sin(\pi - \beta_i)$ are unit vectors in the directions of bending forces $F_{\beta_{i-1}}$ and $F_{\beta_{i+1}}$ respectively.

Then, the bending force applied to the mass point i is $$F_i^b = F_{\beta_{i-1}} + F_{\beta_{i+1}} \qquad (7).$$

Torsion Force

Figure 6:
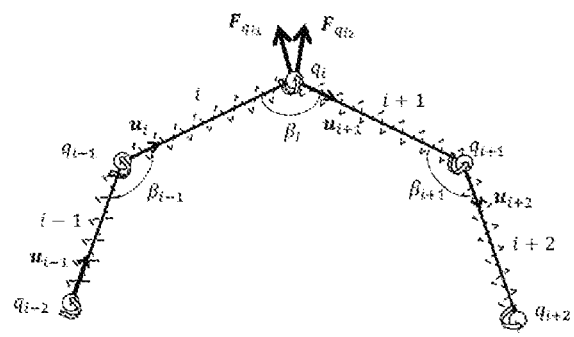
FIG. 6 is a schematic diagram of the discrete mass points subjected to torsion forces according to the second embodiment of the present disclosure.

As shown in FIG. 6, due to the existing of torsion springs, the mass point i is applied with torsion forces generated by two torsion springs attached on the cable segments i−1 and i+2. Wherein a torsion force applied by a torsion spring attached on the cable segment i−1 to the mass point i is $$F_{qi1} = k^t \times (q_{i-2} - q_{i-1}) \times \sin(\pi - \beta_{i-1}) \times [u_i \times u_{i-1} / \sin(\pi - \beta_{i-1})] \qquad (8);$$

and a torsion force applied by a torsion spring attached on the cable segment i+2 to the mass point i is $$F_{qi2} = k^t \times (q_{i+2} - q_{i+1}) \times \sin(\pi - \beta_{i+1}) \times [u_{i+2} \times u_{i+1} / \sin(\pi - \beta_{i+1})] \qquad (9).$$

Wherein $k^t$ is an elastic coefficient of the torsion spring, which is related to torsion rigidity of the cable; $q_i$ is a torsion angle at the mass point i, and it is assumed that relative torsion angles between both ends of the cable are uniformly distribute on the cable segments to facilitate the calculation; $u_i \times u_{i-1} / \sin(\pi - \beta_{i-1})$ and $u_{i+2} \times u_{i+1} / \sin(\pi - \beta_{i+1})$ are unit vectors in the directions of torsion forces $F_{qi1}$ and $F_{qi2}$, respectively.

Then, the torsion force applied to the mass point i is $$F_i^t = F_{qi1} + F_{qi2} \qquad (10).$$

In summary, the force applied to the mass point i is $$F_i = G_i + F_i^s + F_i^b \times F_i^t \qquad (11).$$

[5]. Collision detection and collision response of the cable

Fast and accurate collision detection and collision response is a basic of improving the reality and immersion of the assembly simulation of the cable. Since the cable is a flexible body, it can change its posture when collided with the surrounding environment so as not to penetrate through other objects, resulting in deformation response. Therefore, in the process of assembly simulation, it is not only needs to detect whether the cable suffers collision, but also to feed back the collision information when it occurs, so as to achieve the deformation response of the cable. Moreover, different from a static cable, real-time human-computer interaction is needed to be achieved in the assembly simulation of the cable. Therefore, a higher requirement is requested in the efficiency of the collision detection and collision response.

Currently, common collision detection methods include a bounding volume hierarchy (BVH) method, a space decomposition method, a distance field based method, an image space based method, and intelligent algorithms etc. The most common method is the bounding volume hierarchy method, and the bounding volume may include different types such as an aligned axis bounding box (AABB), an oriented bounding box (OBB), a bounding sphere, a k-Dop (Discrete Orientation Polytope) and convex hull etc. In the process of assembly simulation, the geometry of the flexible cable changes continually, so that the collision model of the flexible cable is not fixed like that of a rigid structure, and the collision model is needed to be rebuilt and detected in a real time manner. Therefore, in order to determine the area of collision more quickly, the present disclosure employs spherical bounding box hierarchy with better real-time performance.

Collision Model of Cable

The collision detection of the cable needs to meet the requirements of both real-time performance and accuracy. Therefore, two hierarchies are used to build the collision model of the cable in the present disclosure, thereby achieving a more quickly and accurately collision detection.

Figure 7:
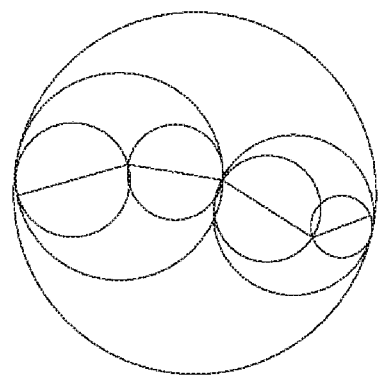
FIG. 7 is a schematic diagram of a spherical bounding volume hierarchy according to the second embodiment of the present disclosure.

A first hierarchy is a spherical bounding box hierarchy, as shown in FIG. 7. Cable information is stored in a form of a tree, and a spherical bounding box hierarchy tree is rapidly created using a bottom-up approach. Leaf nodes of the tree are minimum bounding balls which bounding each of the cable segments, and a parent node is formed by two adjacent sub bounding balls. The parent node is a minimum bounding ball which bounding two sub bounding balls, accordingly, a root node of the tree is a minimum bounding ball which containing the entire cable. During deformation of the cable, the structure of the bounding ball hierarchy tree will not be changed, but only change the sizes and positions of the bounding balls. Therefore, the collision model can be built and updated rapidly, and the efficiency of the collision detection is improved.

A second hierarchy is a patch hierarchy, and a cylindrical bounding box is built using triangular patches for the cable segments, which can more accurately represent the shape of the cable, thereby obtaining more accurate collision information.

Collision Detection of Cable

The collision detection of the cable has two objectives, one is to determine whether the cable is collided with surrounding objects or the cable itself, and the other objective is to feed back collision information such as collision position, collision normal direction etc., once the collision occurs.

When performing the collision detection of the cable, firstly using the spherical bounding box hierarchy in the detection to determine whether the cable suffers collision. If the collision is not detected, there is no cable collision occurs; if it is detected that some leaf nodes i.e. bounding balls corresponding to some cable segments suffer collision, then the cable may suffers collision and the sequence numbers of these cable segments are fed back. A pseudocode of the algorithm for the detection of collision between the cable and the surrounding object, CollisionDetection (A, B), is shown below, wherein "A" refers to a root node of the spherical bounding box hierarchy tree of the cable, and "B" refers to a root node of a bounding box tree of the surrounding object. For the collision with the cable itself, CollisionDetection (A, A) is just needed to be invoked.

Algorithm:

```
CollisionDetection (A, B)
If (A and B do not intersect)              "If A and B do not intersect"
    Return;                                "Return back"
End If
If (A and B are leaves)                    "If A and B are both leaf nodes"
If (A and B are neither same one nor       "If A and B are neither same one
    neighbor)                                  nor neighbor"
    Save A and B as a collision pair;      "A and B are collision pair"
End If
    Return;                                "Return back"
End If
If (A's level is higher than B's)          "If level of A is higher than that
                                               of B"
    Exchange A and B;                      "Exchange A and B"
End If
CollisionDetection (A, B->leftitem);       "Recursively detecting left sub
                                               trees of A and B"
CollisionDetection (A, B->rightitem);      "Recursively detecting right sub
                                               trees of A and B"
End
```

When it is detected by the spherical bounding box hierarchy that some cable segments may suffer collision, the cylindrical bounding boxes of these cable segments are rebuilt using triangular patches, so as to perform an accurately collision detection to determine whether the collision occurs actually. If the collision occurs, then accurate collision information such as the cable segments suffering collision, collision normal direction etc. is fed back, which is used for the following collision response.

Collision Response of Cable

Figure 8:
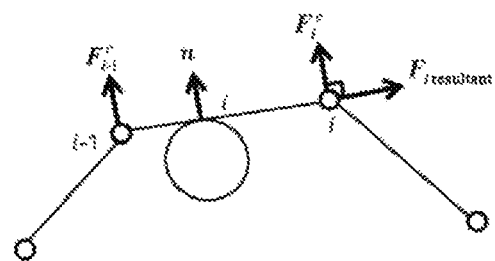
FIG. 8 is a schematic diagram of collision response according to the second embodiment of the present disclosure.

When the cable collided with the surrounding environment and the cable itself, the cable may be deformed under stress to prevent penetration, which action is the collision response of the cable. Based on achieving the collision detection of the cable, the present disclosure adopts a method of implementing collision response based on a supporting force in the normal direction of collision, of which the specific steps include: when the cable suffers collision, the sequence number i of the cable segment which suffers collision and a collision normal direction n (as shown in FIG. 8) can be obtained through the above collision detection process, and supporting forces in the collision normal direction n, that is, $F_{i-1}^c$ and $F_i^c$ shown in FIG. 8, are applied to two mass points i−1 and i at both ends of the cable segment i respectively, so as to compensate the force component of each of the forces in the formula (11) in a collision normal direction −n, so that resultant force in the collision normal direction of the mass points is zero and the mass points can only move in the tangential direction. Therefore, the shape of the cable is changed to prevent the cable from penetrates through other objects. It should be noted that the mass points tend to move away from the collided objects in a case that force components in the direction n of other forces on the mass points have the same direction as the direction n. In this case, no supporting force is applied on the mass points, that is, $F_i^c$ is equal to zero. As can be seen, the expression of $F_i^c$ is $$F_i^c = \begin{cases} [-(G_i + F_i^s + F_i^b + F_i^t) \times n]n & , (G_i + F_i^s + F_i^b + F_i^t) \times n < 0 \\ 0 & , (G_i + F_i^s + F_i^b + F_i^t) \times n \geq 0 \end{cases}. \quad (12)$$

Therefore, considering the collision of the cable, the formula (11) is needed to be modified by adding a supporting force in the collision normal direction, that is $$F_i + G_i + F_i^s + F_i^b + F_i^t + F_i^c \quad (13).$$

[6]. Finally, sequentially calculating the stable positions of the remaining mass points based on stresses.

The force applied to each mass point can be obtained according to the formula (11), and then acceleration of each mass point can be obtained according to Newton's second law F=ma, that is $$a_i = \frac{F_i}{m_i} = \frac{G_i + F_i^s + F_i^b + F_i^t + F_i^c}{m_i}. \quad (14)$$

In order to facilitate the calculation, a time duration is spread into several very short periods of time Δt. Assumed that the position of the mass point i is $x_{i0}$, the velocity of the mass point i is $v_{i0}$, and the acceleration of the mass point i is $a_i$ at time t, then in a period of time from t to t+Δt, the acceleration remains unchanged by default and still is the acceleration $a_i$ at the time t, since Δt is very short. Therefore at the time t+Δt, the velocity of each mass point becomes $$v_i = v_{i0} + a_i \times \Delta t \quad (15).$$

Since Δt is very short, the velocity remains unchanged by default during the period of time Δt, and still is the velocity $v_i$ at the time t+Δt. Therefore at the time t+Δt, the position of each mass point becomes $$x_i = x_{i0} + v_i \times \Delta t \quad (16)$$

Shapes of tension springs, bending springs and torsion springs near one mass point may be affected by the movement of the mass point to a new position, and the forces applied to the remaining mass points are thereby changed to displace the remaining mass points. After all the remaining mass points are calculated completely, it is begin to determine whether each of the mass points reaches an equilibrium state, that is, the acceleration and velocity of each of the mass points are both equal to zero. If the acceleration and velocity are both equal to zero, the calculation is completed; if not, begin to circularly calculate the acceleration, velocity and displacement of each of the mass points in a next period of time Δt until all of the mass points reach equilibrium states.

That is, if the electrical connectors or control points at both ends of the cable have been operated previously, then the tension springs, bending springs and torsion springs in the model will apply forces to other mass points, thereby driving the other mass points to generate accelerations and to be displaced. Finally, all mass points will reach equilibrium states at new positions, that is, the accelerations and velocities of all mass points are equal to zero.

In this case, the positions of all mass points are updated, and a new posture curve of the flexible cable is obtained by performing a cubic-Bezier curve fitting on the positions of the mass points. Further, a stable shape (a stable posture) of the cable is obtained in conjunction with radius information of the flexible cable.

Furthermore, in order to ensure the fixed length constraint of the cable, the length of the cable may be calculated in real time during the calculation process. When the length of the cable exceeds an ultimate tensile length, the calculation is stopped and the shape of the cable is no longer changed with the assembly operations. Moreover, the elastic coefficients of the tension springs in the model is relatively large, and can thereby ensure the substantially fixed length of the cable within the range of ultimate tensile length.

Figure 9:
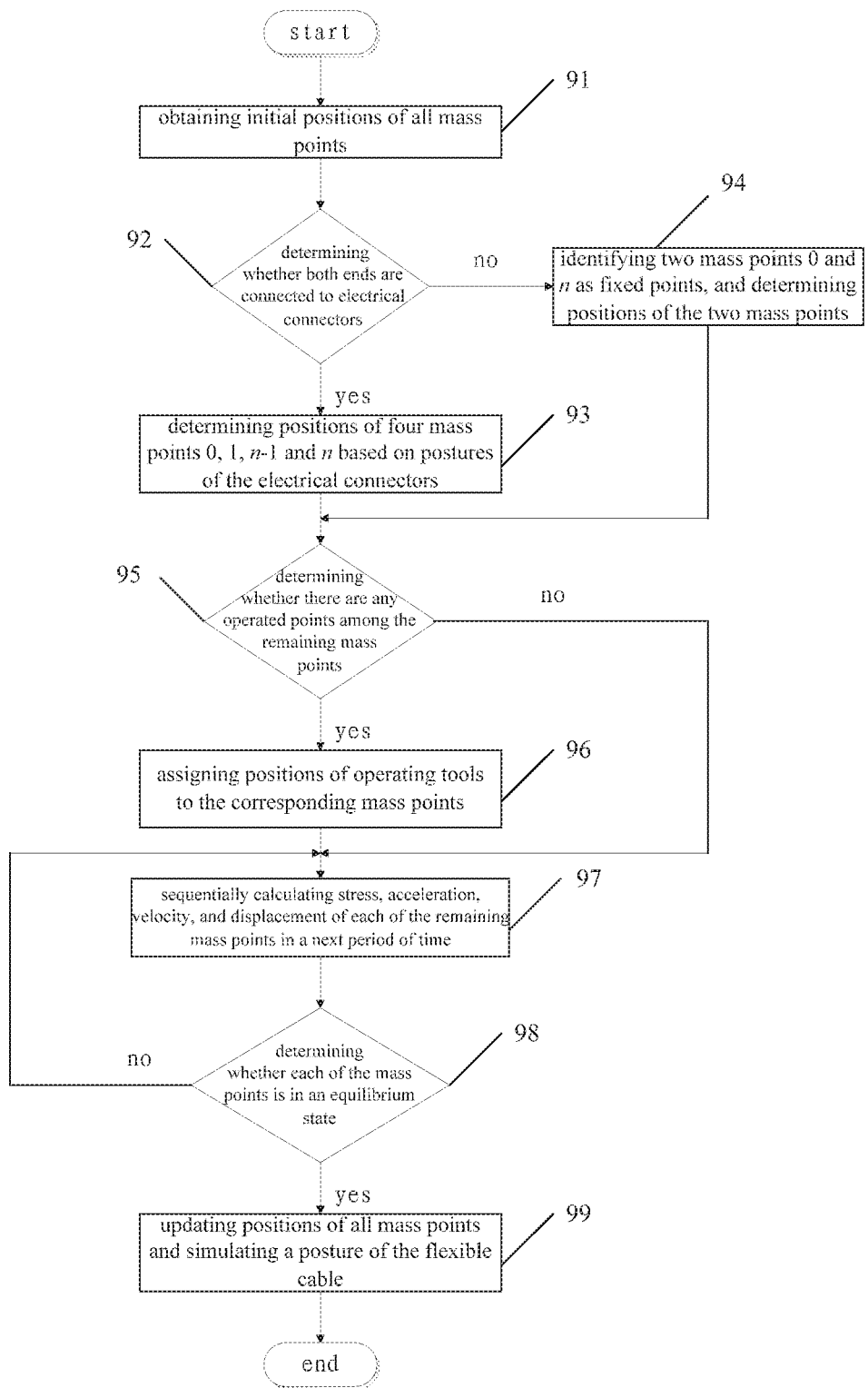
FIG. 9 is a schematic flowchart of a method for simulating a posture of the flexible cable according to the second embodiment of the present disclosure.
Figure 10A:
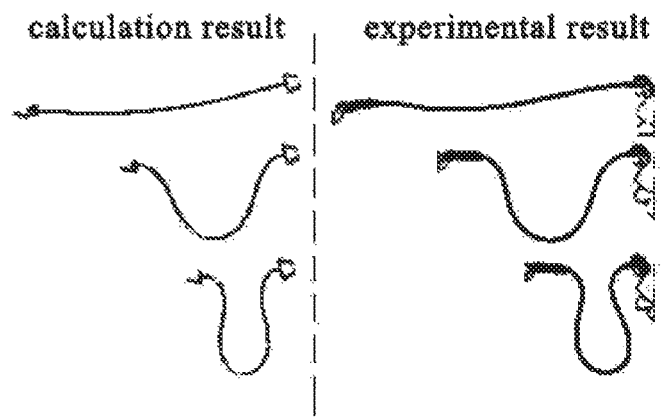
FIG. 10A-10E are schematic diagrams of comparing calculated results for a physical model with experimental results according to the second embodiment of the present disclosure.
Figure 10B:
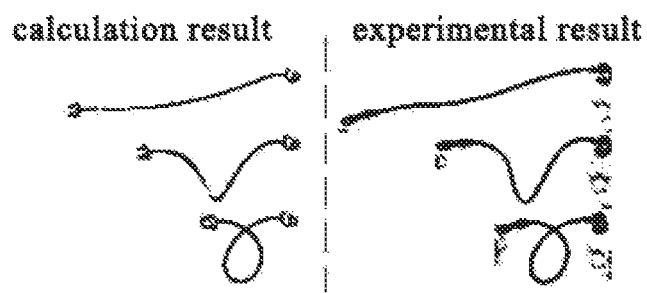
Figure 10C:
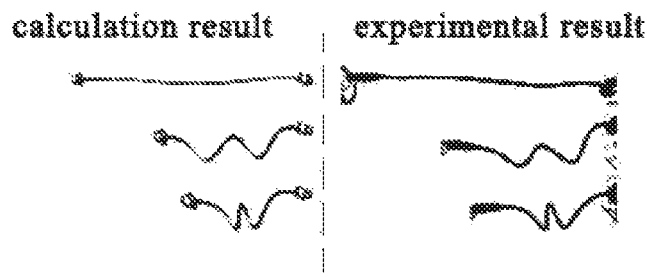
Figure 10D:
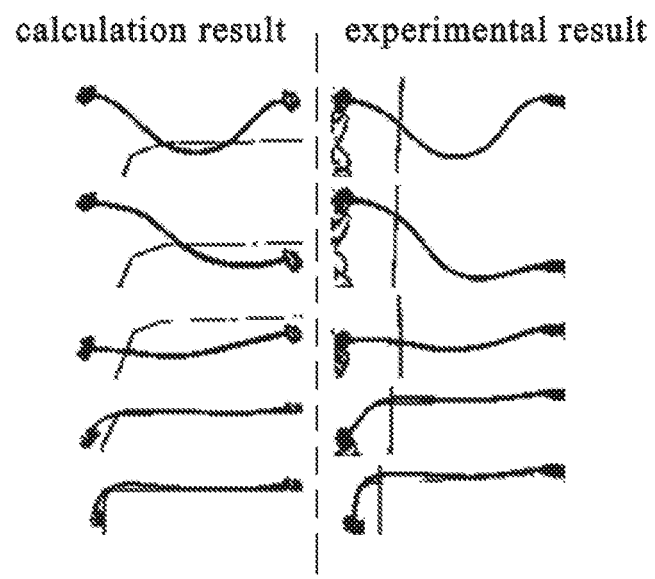
Figure 10E:
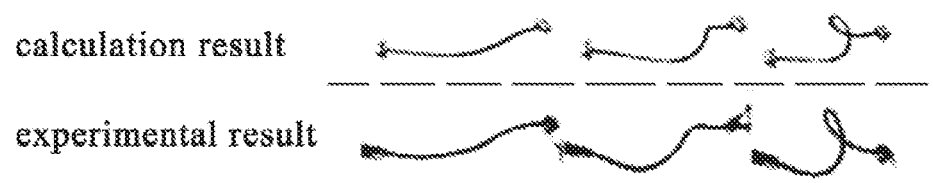

As can be seen from the foregoing, as shown in FIG. 9, the method for simulating a posture of a flexible cable based on a spring-mass model combining bending and torsion according to the second embodiment of the present disclosure includes:

step 91: obtaining initial positions of all mass points;
step 92: determining whether both ends of the flexible cable are connected to electrical connectors, and if so, performing step 93; if not, performing step 94;
step 93: determining positions of four mass points 0, 1, n−1 and n according to postures of the electrical connectors, and then performing step 95;
step 94: identifying two mass points 0 and n as fixed points, and determining positions of the two mass points;
step 95: determining whether there are any operated points among the remaining mass points, and if so, performing step 96; if not, performing step 97;
step 96: assigning positions of operating tools to the corresponding mass points;
step 97: sequentially calculating a stress, an acceleration, a velocity, and a displacement of each of the remaining mass points in the next period of time $\Delta t$;
step 98: determining whether each of the mass points is in an equilibrium state, and if so, performing step 99; if not, returning to step 97; and
step 99: updating positions of all mass points and simulating a posture of the flexible cable.

In addition, in order to demonstrate that a real simulation effect can be achieved with the method for simulating a posture of a flexible cable according to the second embodiment of the present disclosure, calculation results and experimental results of the above physical model are compared with each other in the second embodiment, and verification experiment is performed using the cable with the same calculation parameters under the same movement trend.

As successively shown in FIGS. 10A-10E, they respectively shown that:
simulation of a movement process of a cable in which its left end is gradually close to its right end, and the two ends of the cable are not twisted with respect to each other;
simulation of a movement process of a cable in which its left end is gradually close to its right end after been rotated 180 degrees in a clockwise direction with respect to the right end;
simulation of a movement process of a cable in which its left end is gradually close to the right end after been rotated 900 degrees in a clockwise direction with respect to the right end;
simulation of collision detection and collision response of a cable, in which right end of the cable firstly drops down and collided with a desktop, and then left end of the cable drops down and finally hangs at the edge of the desktop;
and simulation of a movement process of a cable in which right end of the cable is gradually close to the left end while rotates in a clockwise direction when the cable lies on a desktop, wherein the right end finally been rotated 360 degrees with respect to the left end, and a collision between the cable and the desktop is also contained in this process.

As can be seen from the figures, the simulation results are basically identical to the experimental results, which indicate that the above-described physical model can more truly represent the spatial shape of the cable, and having a good cable collision response effect.

As for the solving rate of the model, a time duration for calculating a shape of the cable once is about 15 ms. Whereas in the interactive assembly simulation of the cable, in order to ensure smooth action, the refresh rate is at least ensured to be not less than 30 frames/s, that is, a time duration for solving the cable once must be less than 33 ms. Thus the solving rate of the cable model is relatively fast, and implementation of the collision detection and collision response of the cable is more efficient, and can meet the real-time requirement in the interactive assembly simulation.

A interactive assembly simulation of the cable and a verification with examples are also performed using the above-described physical model in the second embodiment of the present disclosure, specifically as follows.

Simulation Process

Figure 11:
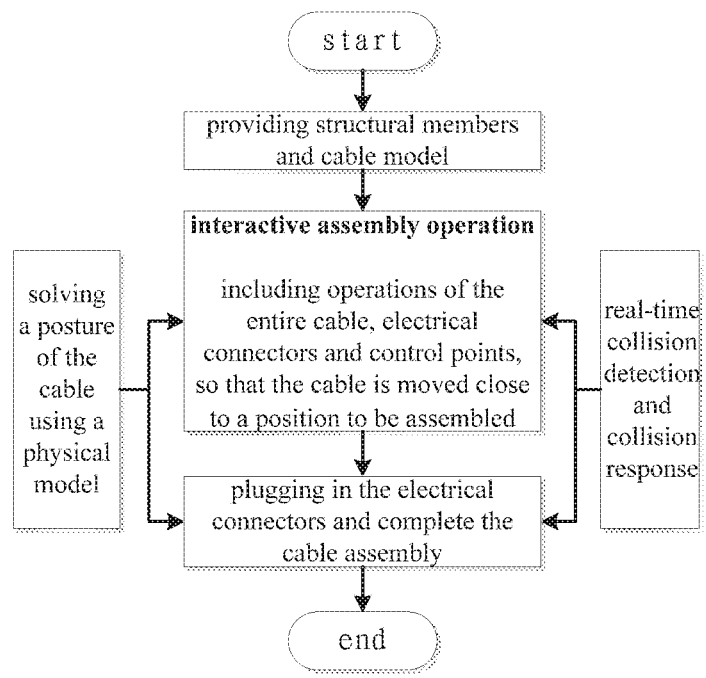
FIG. 11 is a schematic flowchart of a method for simulating a posture of a flexible cable according to the second embodiment of the present disclosure.
Figure 12A:
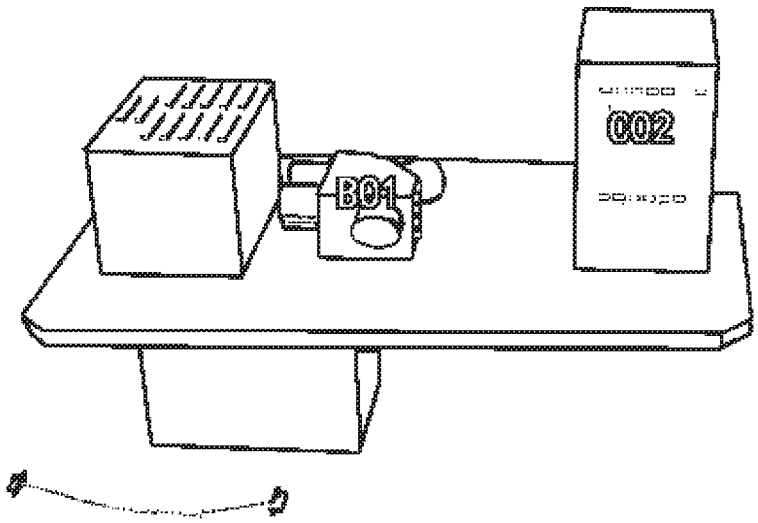
FIG. 12A-12F are schematic diagrams of interactive simulation application of the flexible cable according to the second embodiment of the present disclosure.
Figure 12B:
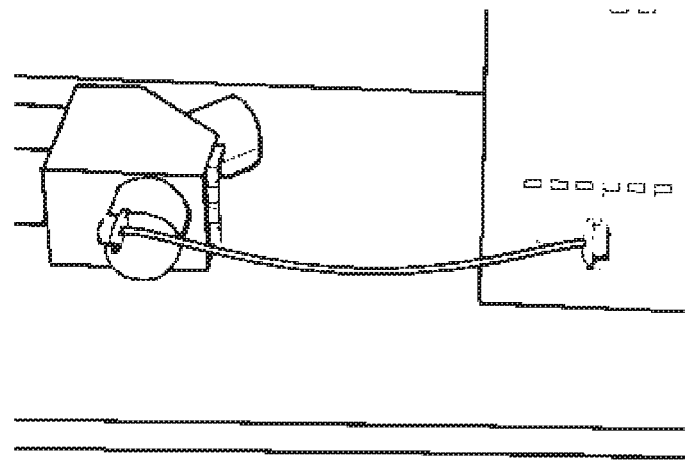
Figure 12C:
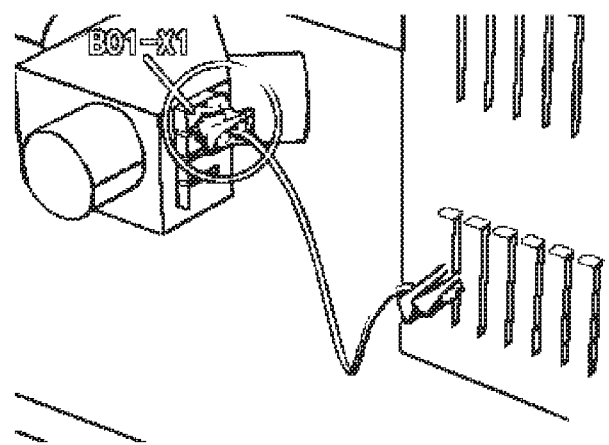
Figure 12D:
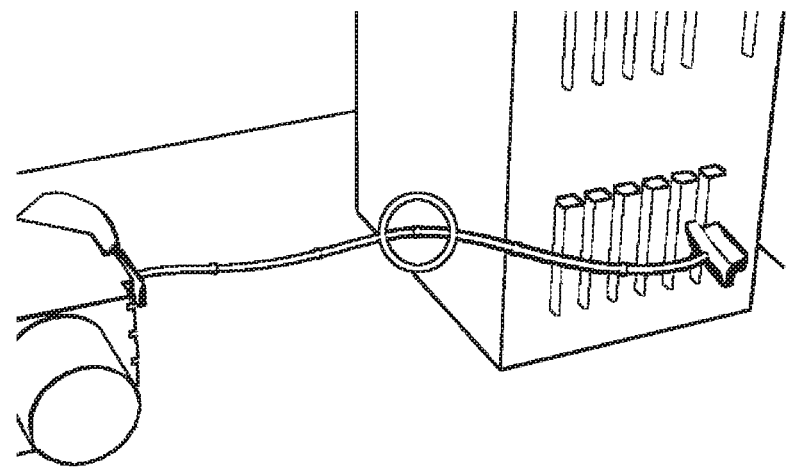
Figure 12E:
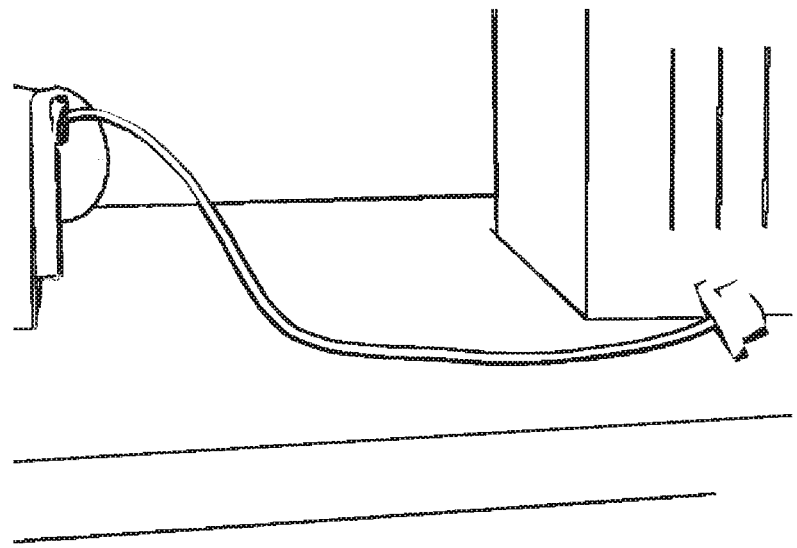
Figure 12F:
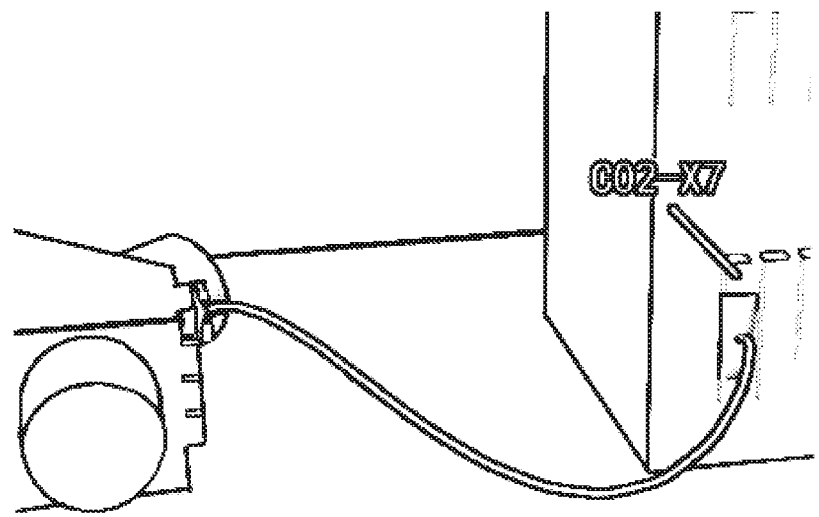

The whole assembly simulation process of the cable is shown in FIG. 11. First, a CAD model of structural members of a product and the flexible cable model are imported into the system. Then an interactive assembly operation is performed for the cable, which including operations of the entire cable, electrical connectors and control points, so that the cable is reached to a position to be assembled. The electronic connectors are plugged in and the assembly simulation of the cable is completed after the cable is adjusted partially. In the whole simulation process, the physical model of the cable can be called in a real-time manner for solution, so as to obtain the posture of the cable. Additionally, collision detection is performed on the cable in a real-time manner in the whole process, and the cable may be deformed when the cable is collided with the surrounding environment to implement the collision response.

Verification with Examples

The practicability and real-time performance of the spring-mass point physical model combining bending and torsion are verified using the interactive assembly simulation system of the cable. A three-dimensional environment is built using a three-dimensional modeling engine ACIS and a three-dimensional display/interactive toolkit HOOPS in the system, wherein the model of the structural members is modeled in Pro/E and is imported into the system through a data conversion interface, and a keyboard and a mouse are used as input devices, thereby achieving the assembly operations of the cable and other virtual objects. The development and operation environments of the system are shown in table 1.

TABLE 1

| operation environment of system | |
|---|---|
| System Index | Specific Parameters |
| CPU | 3.40 GHz Intel Core i7-3770 CPU |
| Graphics card | NVIDIA GeForce GTX650 Ti |
| Memory | 4 GB |
| Operating system | Window 7 |

Preferably, the above-described system for solving a model using the method for simulating a posture of a flexible cable according to the second embodiment of the present disclosure will trigger the solution process as shown in FIG. 9 when each time refresh.

Furthermore, FIGS. 12A-12F show examples of interactive simulation application for the cable. The assembly task is to install the cable in between a socket terminal B01-X1 of a device B01 and a socket terminal C02-X7 of a device C02, and the assembly process includes:

first, importing the needed structural model and cable model into the system;

then manipulating the entire cable to move the cable near the position to be assembled;

manipulating an electrical connector at one end of the cable, so as to move the electrical connector close to B01-X1 and plug the electrical connector into B01-X1;

manipulating the control points of the cable if needed to simulate the operation of the cable body when installing, thereby achieving partial adjustment of the cable;

the cable may suffer collision during the operation process, and the cable may be deformed in this case so as not to penetrate into other objects;

manipulating an electrical connector at the other end to move the electrical connector close to C02-X7 and plug the electrical connector into C02-X7, so that complete the assembly of the entire cable.

As can be seen from the figures, the above-described system can simulate the interactive assembly process of the cable, wherein the spring-mass model combining bending and torsion can more truly represent the spatial shape of the cable, and have a better cable collision response effect.

Third Embodiment

Figure 13:
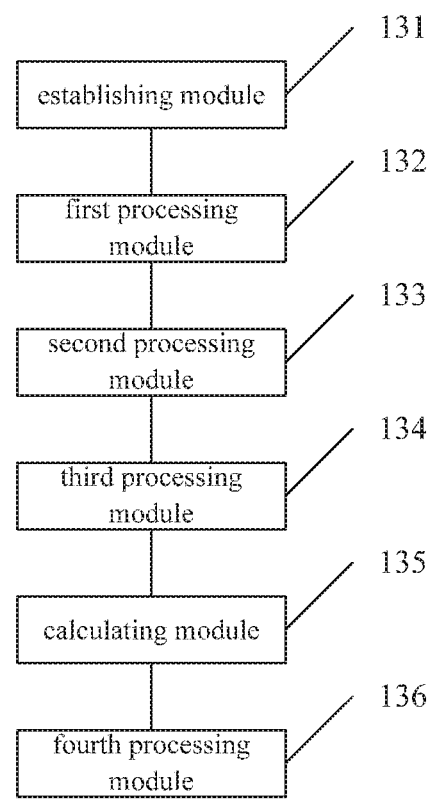
FIG. 13 is a schematic diagram of a structure of an apparatus for simulating a posture of a flexible cable according to a third embodiment of the present disclosure.

As shown in FIG. 13, an apparatus for simulating a posture of a flexible cable based on a spring-mass model combining bending and torsion according to a third embodiment of the present disclosure includes:

an establishing module 131 configured to represent the flexible cable by combining and arranging multiple discrete mass points and establish a physical property model of the flexible cable, wherein a tensile property of the flexible cable is represented by a linear spring between two adjacent discrete mass points on the flexible cable, a bending property of the flexible cable is represented by a bending spring attached at each of the discrete mass points, and a torsion property of the flexible cable is represented by a torsion spring attached at each cable segment of the flexible cable;

a first processing module 132 configured to obtain an initial position of each of the discrete mass points based on processing on a total length of the flexible cable and the number of the cable segments;

a second processing module 133 configured to determine discrete mass points at both ends of the flexible cable as fixed points, and obtain position information of the fixed points;

a third processing module 134 configured to calculate the stress information of the other discrete mass points whose position information is not determined on the flexible cable based on the physical property model;

a calculating module 135 configured to sequentially calculate equilibrium positions of the other discrete mass points whose position information is not determined by using the obtained stress information and the initial positions, so as to obtain the position information of the other discrete mass points;

a fourth processing module 136 configured to simulate a stable posture of the flexible cable based on the position information of the fixed points and the position information of the other discrete mass points on the flexible cable.

With the apparatus for simulating a posture of a flexible cable based on a spring-mass model combining bending and torsion according to the third embodiment of the present disclosure, a representation of the torsion property of the cable is added in the physical property model of the flexible cable, and then the stable posture of the flexible cable is obtained through processing. Therefore, the simulation effect of the flexible cable is more real, and the reliability in the process of assembling the flexible cable is ensured to a certain degree.

Further, the apparatus further includes a first judging module, which is configured to determining whether the both ends of the flexible cable are connected to electrical connectors before the discrete mass points at both ends of the flexible cable are identified as fixed points by the second processing module;

if so, the second processing module is specifically configured to obtain position information of the fixed points, and calculate position information of two discrete mass points adjacent to the fixed points on the flexible cable;

correspondingly, the third processing module is configured to calculate the stress information of the other discrete mass points, in addition to the fixed points and the two discrete mass points adjacent to the fixed points, based on the physical property model; and if not, the second processing module is specifically configured to only identify the discrete mass points at both ends of the flexible cable as fixed points, and obtain position information of the fixed points;

correspondingly, the third processing module is configured to calculate the stress information of the other discrete mass points, in addition to the fixed points, based on the physical property model.

Specifically, the second processing module includes a first processing sub-module, which is configured to set the two discrete mass points adjacent to the fixed points to be located in a tangential direction of each of the fixed points respectively, and calculating position information of the two discrete mass points adjacent to the fixed points on the flexible cable.

Furthermore, the apparatus further includes a second determining module, which is configured to determine whether there are any operated points among the other discrete mass points in addition to the fixed points, before the step of calculating the stress information of the other discrete mass points whose position information is not determined on the flexible cable based on the physical property model by the third processing module;

if so, the third processing module is specifically configured to obtain position information of the operated points based on position information of corresponding operating tools, and then perform the operation of calculating stress information of other discrete mass points whose position information is not determined on the flexible cable based on the physical property model; and if not, the third processing module is specifically configured to directly perform the operation of calculating the stress information of the other discrete mass points whose position information is not determined on the flexible cable based on the physical property model.

As can be seen from the above, the third processing module includes a first calculating sub-module, which is configured to calculate gravity forces, tensile forces, bending forces and torsion forces applied to the other discrete mass points.

The first calculating sub-module includes: an analyzing sub-module configured to obtain, through analysis, torsion forces $F_{qi1}$ and $F_{qi2}$ applied by two torsion springs attached on cable segments i−1 and i+2 a mass point i among the other discrete mass points; an obtaining sub-module configured to obtain torsion force components $F_{qi1}$ and $F_{qi2}$ applied by the cable segments i−1 and i+2 to the mass point i respectively; and a summing sub-module configured to obtain a torsion force $F_i^t$ applied to the mass point i by summing the obtained torsion force components $F_{qi1}$ and $F_{qi2}$.

Preferably, the obtaining sub-module is implemented according to the following calculation formulae:

$$F_{qi1}=k^t\times(q_{i-2}-q_{i-1})\times\sin(\pi-\beta_{i-1})\times[u_i\times u_{i-1}/\sin(\pi-\beta_{i-1})]; \text{ and}$$

$$F_{qi2}=k^t\times(q_{i+2}-q_{i+1})\times\sin(\pi-\beta_{i+1})\times[u_{i+2}\times u_{i+1}/\sin(\pi-\beta_{i+1})].$$

Wherein $F_{qi1}$ is a torsion force component applied by the cable segment i−1 to the mass point i; $F_{qi2}$ is a torsion force component applied by the cable segment i+2 to the mass point i; $k^t$ is an elastic coefficient of the torsion spring; $q_{i-2}$, $q_{i-1}$, $q_{i+1}$ and $q_{i+2}$ are torsion angles at mass point i−2, i−1, i+1 and i+2, respectively; $\beta_{i-1}$ is an angle between the $(i-1)^{th}$ cable segment and $i^{th}$ cable segment; $\beta_{i-1}$ is an angle between the $(i+1)^{th}$ cable segment and the $(i+2)^{th}$ cable segment; $u_i\times u_{i-1}/\sin(\pi-\beta_{i-1})$ and $u_{i+2}\times u_{i+1}/\sin(\pi-\beta_{i+1})$ are unit vectors in the directions of the torsion force components $F_{qi1}$ and $F_{qi2}$, respectively; $u_{i-1}$, $u_i$, $u_{i+1}$ and $u_{i+2}$ are a unit vector from the mass point i−2 to the mass point i−1, a unit vector from the mass point i−1 to the mass point i, a unit vector from the mass point i to the mass point i+1, and a unit vector from the mass point i+1 to the mass point i+2, respectively.

Considering a case of the collision of the flexible cable in actual applications, the apparatus further includes: a fifth processing module, which is configured to perform collision detection and collision response on the flexible cable before the step of sequentially calculating equilibrium positions of the other discrete mass points whose position information is not determined by using the obtained stress information and the initial positions, so as to obtain the position information of the other discrete mass points; and a modifying module, which is configured to modify the force information according to the collision detection and collision response.

Specifically, the modifying module includes an adding sub-module, which is configured to add a supporting force $F_i^c$ along a normal direction of collision into the force information, and $$F_i^c = \begin{cases} [-(G_i + F_i^s + F_i^b + F_i^t)\times n]n & ,(G_i + F_i^s + F_i^b + F_i^t)\times n < 0 \\ 0 & ,(G_i + F_i^s + F_i^b + F_i^t)\times n \geq 0 \end{cases}.$$

wherein $G_i$ represents a gravity force applied to the discrete mass point i; $F_i^s$ represents a tensile force applied to the discrete mass point i; $F_i^b$ represents a bending force applied to the discrete mass point i; $F_i^t$ represents a torsion force applied to the discrete mass point i; n represents a normal direction of collision of the discrete mass point i.

In an embodiment of the present disclosure, optionally, the calculating module includes:
a second calculating sub-module configured to calculating accelerations of the other discrete mass points based on the force information;
a third configured to calculating sub-module configured to calculating speeds of the other discrete mass points at a predetermined time based on initial speeds and the accelerations;
a fourth configured to calculating sub-module configured to obtain positions of the other discrete mass points at the predetermined time based on the speeds and the initial positions; and
a second processing sub-module configured to perform force analysis on the other discrete mass points at the positions at the predetermined time, and determine whether each of the other discrete mass points reaches an equilibrium state;
if so, identifying the positions at the predetermined time as the position information of the other discrete mass points;
if not, returning to the operation of calculating the stress information of the other discrete mass points whose position information is not determined on the flexible cable based on the physical property model.

Specifically, the fourth processing module includes: a fitting sub-module configured to perform cubic-Bezier curve fitting based on the position information of the fixed points and the position information of the other discrete mass points, so as to obtain a posture curve of the flexible cable; and a third processing sub-module configured to simulate a stable posture of the flexible cable based on the posture curve of the flexible cable and radius information.

The above-described embodiments of the method for simulating a posture of a flexible cable are all adapted to the embodiments of the apparatus for simulating a posture of a flexible cable, and the same technical effect can also be achieved.

It should be noted that many functional components described in this specification are called as modules/sub-modules, in order to more particularly emphasize the independence of their implementations.

In the embodiments of the present disclosure, the modules/sub-modules can be implemented using software, so as to be executed by various types of processors. For example, an identified executable code module may include one or more physical or logical blocks of computer instructions, for example, which can be constructed to be an object, a procedure, or a function. Nevertheless, the executable codes of the identified module are not needed to be physically located together, but may include different instructions stored in different positions. The module is constructed and the specified objective of the module is achieved when those instructions are logically combined together.

In practice, the executable code module may include a single instruction, or many instructions, and even may be distributed on multiple different code segments, in different programs, or even across multiple storage devices. Similarly, the operational data may be identified within the module, and may be implemented in accordance with any suitable form and be organized within any suitable type of data structure. The operational data may be collected as a single data set, or may be distributed in different positions (including different storage devices), and at least part of the operational data may exist in a system or network only as an electronic signal.

When the module can be implemented with software, considering the current level of hardware technology, for the module which can be implemented with software, those skilled in the art can build a corresponding hardware circuit to achieve a corresponding function without considering the cost. The hardware circuit includes a very large scale integration (VLSI) or gate arrays and the conventional semiconductor such as a logic chip, a transistor, or other discrete components. The module may also be implemented using a programmable hardware device, such as field programmable gate arrays, programmable array logic, and programmable logic device.

The forgoing descriptions are only the preferred embodiments of the present disclosure, and it should be noted that numerous improvements and modifications made to the present disclosure can further be made by those skilled in the art without being departing from the principle of the present disclosure, and those improvements and modifications shall fall into the scope of protection of the present disclosure.

What is claimed is:

1. A method for simulating a posture of a flexible cable based on a spring-mass model combining bending and torsion, comprising:
    representing the flexible cable by combining and arranging a plurality of discrete mass points, so as to establish a physical property model of the flexible cable, wherein:
        a tensile property of the flexible cable is described by a linear spring between two adjacent discrete mass points on the flexible cable,
        a bending property of the flexible cable is described by a bending spring attached at each of the discrete mass points, and
        a torsion property of the flexible cable is described by a torsion spring attached at each cable segment of the flexible cable;
    obtaining an initial position of each of the discrete mass points based on a total length of the flexible cable and the number of the cable segments;
    identifying the discrete mass points at both ends of the flexible cable as fixed points, and obtaining position information of the fixed points;
    calculating stress information at the other discrete mass points whose position information is not determined on the flexible cable based on the physical property model;
    sequentially calculating equilibrium positions of the other discrete mass points whose position information is not determined by using the obtained stress information and the initial positions, so as to obtain the position information of the other discrete mass points; and
    simulating a stable posture of the flexible cable based on the position information of the fixed points and the position information of the other discrete mass points on the flexible cable.

2. The method according to claim 1, further comprising:
    determining whether the both ends of the flexible cable are connected to electrical connectors before identifying the discrete mass points at both ends of the flexible cable as fixed points; wherein
    if the both ends are connected, obtaining the position information of the fixed points, and calculating position information of two discrete mass points adjacent to the fixed points on the flexible cable;
    correspondingly, the step of calculating stress information of the other discrete mass points whose position information is not determined on the flexible cable based on the physical property model comprises calculating the stress information of the other discrete mass points, in addition to the fixed points and the two discrete mass points adjacent to the fixed points, based on the physical property model; and
    alternatively, if the ends are not connected, only identifying the discrete mass points at both ends of the flexible cable as fixed points, and obtaining position information of the fixed points;
    correspondingly, the step of calculating stress information of the other discrete mass points of which position information is not determined on the flexible cable based on the physical property model comprises calculating the stress information of the other discrete mass points, in addition to the fixed points, based on the physical property model.

3. The method according to claim 2, wherein the step of calculating position information of the two discrete mass points adjacent to the fixed points on the flexible cable comprises:
    setting the two discrete mass points adjacent to the fixed points to be respectively located in tangential direction of each of the fixed points, and
    obtaining the position information of the two discrete mass points adjacent to the fixed points on the flexible cable through calculation.

4. The method according to claim 1, further comprising determining whether there are any operated points among the other discrete mass points in addition to the fixed points before the step of calculating stress information of the other discrete mass points whose position information is not determined on the flexible cable based on the physical property model, wherein
    if there is at least one operated point, obtaining position information of the operated points based on position information of corresponding operating tools, and then performing the step of calculating the stress information of the other discrete mass points whose position information is not determined on the flexible cable based on the physical property model.

5. The method according to claim 1, wherein the step of calculating stress information of the other discrete mass points whose position information is not determined on the flexible cable based on the physical property model comprises:
    calculating a gravity force, a tensile force, a bending force and a torsion force applied to the other discrete mass points, wherein the step of calculating the torsion force applied to the other discrete mass points comprises:
    obtaining, through analysis, torsion forces $F_{qi1}$ and $F_{qi2}$ applied by two torsion springs attached on cable segments i−1 and i+2 to a mass point i among the other discrete mass points;
    obtaining torsion force components $F_{qi1}$ and $F_{qi2}$ applied by the cable segments i−1 and i+2 to the mass point i respectively; and
    obtaining a torsion force $F_i^t$ applied to the mass point i by summing the obtained torsion force components $F_{qi1}$ and $F_{qi2}$.

6. The method according to claim 5, wherein the step of obtaining torsion force components $F_{qi1}$ and $F_{qi2}$ applied by the cable segments i−1 and i+2 to the mass point i respectively is performed using the following calculation formulae $$F_{qi1}=k^t\times(q_{i-2}-q_{i-1})\times\sin(\pi-\beta_{i-1})\times[u_i\times u_{i-1}/\sin(\pi-\beta_{i-1})]; \text{ and}$$

$$F_{qi2}=k^t\times(q_{i+2}-q_{i+1})\times\sin(\pi-\beta_{i+1})\times[u_{i+2}\times u_{i+1}/\sin(\pi-\beta_{i+1})]; \text{ wherein:}$$

$F_{qi1}$ is a torsion force component applied by the cable segment i−1 to the mass point i;

$F_{qi2}$ is a torsion force component applied by the cable segment i+2 to the mass point i;

$k^t$ is an elastic coefficient of the torsion spring;

$q_{i-2}$, $q_{i-1}$, $q_{i+1}$ and $q_{i+2}$ are torsion angles at mass points i−2, i−1, i+1 and i+2, respectively;

$\beta_{i-1}$ is an angle between the $(i-1)^{th}$ cable segment and the $i^{th}$ cable segment;

$\beta_{i+1}$ is an angle between the $(i+1)^{th}$ cable segment and the $(i+2)^{th}$ cable segment;

$u_i \times u_{i-1}/\sin(\pi-\beta_{i-1})$ and $u_{i+2} \times u_{i+1}/\sin(\pi-\beta_{i+1})$ are unit vectors in the directions of the torsion force components $F_{qi1}$ and $F_{qi2}$, respectively; and $u_{i-1}$, $u_i$, $u_{i+1}$ and $u_{i+2}$ are a unit vector from the mass point i−2 to the mass point i−1, a unit vector from the mass point i−1 to the mass point i, a unit vector from the mass point i to the mass point i+1, and a unit vector from the mass point i+1 to the mass point i+2, respectively.

7. The method according to claim 1, wherein before the step of sequentially calculating equilibrium positions of the other discrete mass points whose position information is not determined by using the obtained stress information and the initial positions, so as to obtain the position information of the other discrete mass points, the method further comprises:

performing collision detection and collision response for the flexible cable; and modifying the stress information based on the collision detection and collision response.

8. The method according to claim 7, wherein the step of modifying the stress information based on the collision detection and collision response comprises adding a supporting force $F_i^c$ along a normal direction of collision into the stress information, and $$F_i^c = \begin{cases} [-(G_i + F_i^s + F_i^b + F_i^t) \times n]n & , (G_i + F_i^s + F_i^b + F_i^t) \times n < 0 \\ 0 & , (G_i + F_i^s + F_i^b + F_i^t) \times n \geq 0 \end{cases},$$

$G_i$ represents a gravity force applied to a discrete mass point i;

$F_i^s$ represents a tensile force applied to the discrete mass point i;

$F_i^b$ represents a bending force applied to the discrete mass point i;

$F_i^t$ represents a torsion force applied to the discrete mass point i; and n represents a normal direction of collision of the discrete mass point i.

9. The method according to claim 1, wherein the step of sequentially calculating equilibrium positions of the other discrete mass points whose position information is not determined by using the obtained stress information and the initial positions, so as to obtain the position information of the other discrete mass points comprises:

calculating accelerations of the other discrete mass points based on the stress information;

calculating speeds of the other discrete mass points at a predetermined time based on initial speeds and the accelerations;

calculating positions of the other discrete mass points at the predetermined time based on the speeds and the initial positions; and performing stress analysis on the other discrete mass points at the positions at the predetermined time, and determining whether each of the other discrete mass points reaches an equilibrium state;

if each of the other discrete mass points reaches an equilibrium state, identifying the positions at the predetermined time as the position information of the other discrete mass points; and alternatively, if one of the other discrete mass points does not reach an equilibrium state, returning to the step of calculating the stress information of the other discrete mass points whose position information is not determined on the flexible cable based on the physical property model.

10. The method according to claim 1, wherein the step of simulating a stable posture of the flexible cable based on the position information of the fixed points and the position information of the other discrete mass points on the flexible cable comprises:

performing cubic-Bezier curve fitting based on the position information of the fixed points and the position information of the other discrete mass points, so as to obtain a posture curve of the flexible cable; and simulating a stable posture of the flexible cable based on the posture curve of the flexible cable and radius information.

11. An apparatus for simulating a posture of a flexible cable based on a spring-mass model combining bending and torsion, comprising:

an establishing module configured to represent the flexible cable by combining and arranging a plurality of discrete mass points and establish a physical property model of the flexible cable, wherein in the physical property model of the flexible cable:

a tensile property of the flexible cable is represented by a linear spring between two adjacent discrete mass points on the flexible cable, a bending property of the flexible cable is represented by a bending spring attached at each of the discrete mass points, and a torsion property of the flexible cable is represented by a torsion spring attached at each cable segment of the flexible cable;

a first processing module configured to obtain an initial position of each of the discrete mass points based on a total length of the flexible cable and the number of the cable segments;

a second processing module configured to identify the discrete mass points at both ends of the flexible cable as fixed points, and obtain position information of the fixed points;

a third processing module configured to calculate stress information of the other discrete mass points whose position information is not determined on the flexible cable based on the physical property model;

a calculating module configured to sequentially calculate equilibrium positions of the other discrete mass points whose position information is not determined by using the obtained stress information and the initial positions, so as to obtain the position information of the other discrete mass points; and a fourth processing module configured to simulate a stable posture of the flexible cable based on the position information of the fixed points and the position information of the other discrete mass point on the flexible cable.

12. A system, comprising:

a processor; and a memory having instructions stored thereon which, when executed by the processor, performs an operation for simulating a posture of a flexible cable based on a spring-mass model combining bending and torsion, the operation comprising:

representing the flexible cable by combining and arranging a plurality of discrete mass points, so as to establish a physical property model of the flexible cable, wherein:

a tensile property of the flexible cable is described by a linear spring between two adjacent discrete mass points on the flexible cable, a bending property of the flexible cable is described by a bending spring attached at each of the discrete mass points, and a torsion property of the flexible cable is described by a torsion spring attached at each cable segment of the flexible cable;

obtaining an initial position of each of the discrete mass points based on a total length of the flexible cable and the number of the cable segments;

identifying the discrete mass points at both ends of the flexible cable as fixed points, and obtaining position information of the fixed points;

calculating stress information at the other discrete mass points whose position information is not determined on the flexible cable based on the physical property model;

sequentially calculating equilibrium positions of the other discrete mass points whose position information is not determined by using the obtained stress information and the initial positions, so as to obtain the position information of the other discrete mass points; and simulating a stable posture of the flexible cable based on the position information of the fixed points and the position information of the other discrete mass points on the flexible cable.

* * * * *